(12) United States Patent
Sukhija et al.

(10) Patent No.: US 11,477,198 B2
(45) Date of Patent: Oct. 18, 2022

(54) DISTRIBUTED COMPUTING ON THE EDGE

(71) Applicant: INTERNATIONAL BUSINESS MACHINES CORPORATION, Armonk, NY (US)

(72) Inventors: Sandeep Sukhija, Noida (IN); Harish Bharti, Pune (IN); Rajesh Kumar Saxena, Mumbai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 321 days.

(21) Appl. No.: 16/887,410

(22) Filed: May 29, 2020

(65) Prior Publication Data
US 2021/0377269 A1 Dec. 2, 2021

(51) Int. Cl.
*H04L 9/40* (2022.01)
(52) U.S. Cl.
CPC .......... *H04L 63/0884* (2013.01); *H04L 63/08* (2013.01); *H04L 63/10* (2013.01)
(58) Field of Classification Search
CPC ..... H04L 63/0884; H04L 63/08; H04L 63/10; H04L 2209/76; H04L 9/3271
See application file for complete search history.

(56) References Cited

U.S. PATENT DOCUMENTS

| 7,620,610 B2 | 11/2009 | Macbeth et al. |
| 8,553,625 B2 | 10/2013 | Shao et al. |
| 2010/0211625 A1* | 8/2010 | Gonzalez Plaza .... H04L 67/563 709/202 |
| 2017/0013012 A1* | 1/2017 | Hansen ................... G06F 21/31 |

FOREIGN PATENT DOCUMENTS

| KR | 101077660 B1 | 6/2010 |
| KR | 20170109954 | 10/2017 |

OTHER PUBLICATIONS

Mell et al., "The NIST Definition of Cloud Computing", NIST, Special Publication 800-145, Sep. 2011, 7 pages.

* cited by examiner

*Primary Examiner* — Huan V Doan
(74) *Attorney, Agent, or Firm* — Daniel Yeates; Andrew D. Wright; Roberts Calderon Safran & Cole P.C.

(57) ABSTRACT

A computer-implemented method includes: receiving, by a computing device, a request from a requester; determining, by the computing device, one or more delegates that are currently capable of handling the request; sending, by the computing device, a request package to each of the one or more delegates, the request package including an authentication challenge; receiving, by the computing device, a solution to the authentication challenge from a supplier, the solution being provided by a particular delegate of the one or more delegates; determining, by the computing device, the solution to the authentication challenge is valid; and instructing, by the computing device and in response to determining the solution to the authentication challenge is valid, the particular delegate to proceed with handling the request.

20 Claims, 9 Drawing Sheets

DISTRIBUTED COMPUTING ON THE EDGE

BACKGROUND

Aspects of the present invention relate generally to computing systems and, more particularly, to distributed computing on the edge.

A distributed computing system is a system whose components are located on different networked computers. Many such systems include a central controller that is remotely located from many of the networked computers.

SUMMARY

In a first aspect of the invention, there is a computer-implemented method including: receiving, by a computing device, a request from a requester; determining, by the computing device, one or more delegates that are currently capable of handling the request; sending, by the computing device, a request package to each of the one or more delegates, the request package including an authentication challenge; receiving, by the computing device, a solution to the authentication challenge from a supplier, the solution being provided by a particular delegate of the one or more delegates; determining, by the computing device, the solution to the authentication challenge is valid; and instructing, by the computing device and in response to determining the solution to the authentication challenge is valid, the particular delegate to proceed with handling the request.

In another aspect of the invention, there is a computer program product including one or more computer readable storage media having program instructions collectively stored on the one or more computer readable storage media. The program instructions are executable to: receive a request from a requester; determine one or more delegates that are currently capable of handling the request; send a request package to each of the one or more delegates, the request package including an authentication challenge; receive a solution to the authentication challenge from a supplier, the solution being provided by a particular delegate of the one or more delegates; determine the solution to the authentication challenge is valid; and instruct, in response to determining the solution to the authentication challenge is valid, the particular delegate to proceed with handling the request.

In another aspect of the invention, there is system including a processor, one or more computer readable storage media, and program instructions collectively stored on the one or more computer readable storage media. The program instructions are executable to: receive an authentication challenge from a trusted entity; determine a solution to the authentication challenge; send the solution to a supplier; receive instructions from the trusted entity to handle a request with the supplier; and handle the request.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
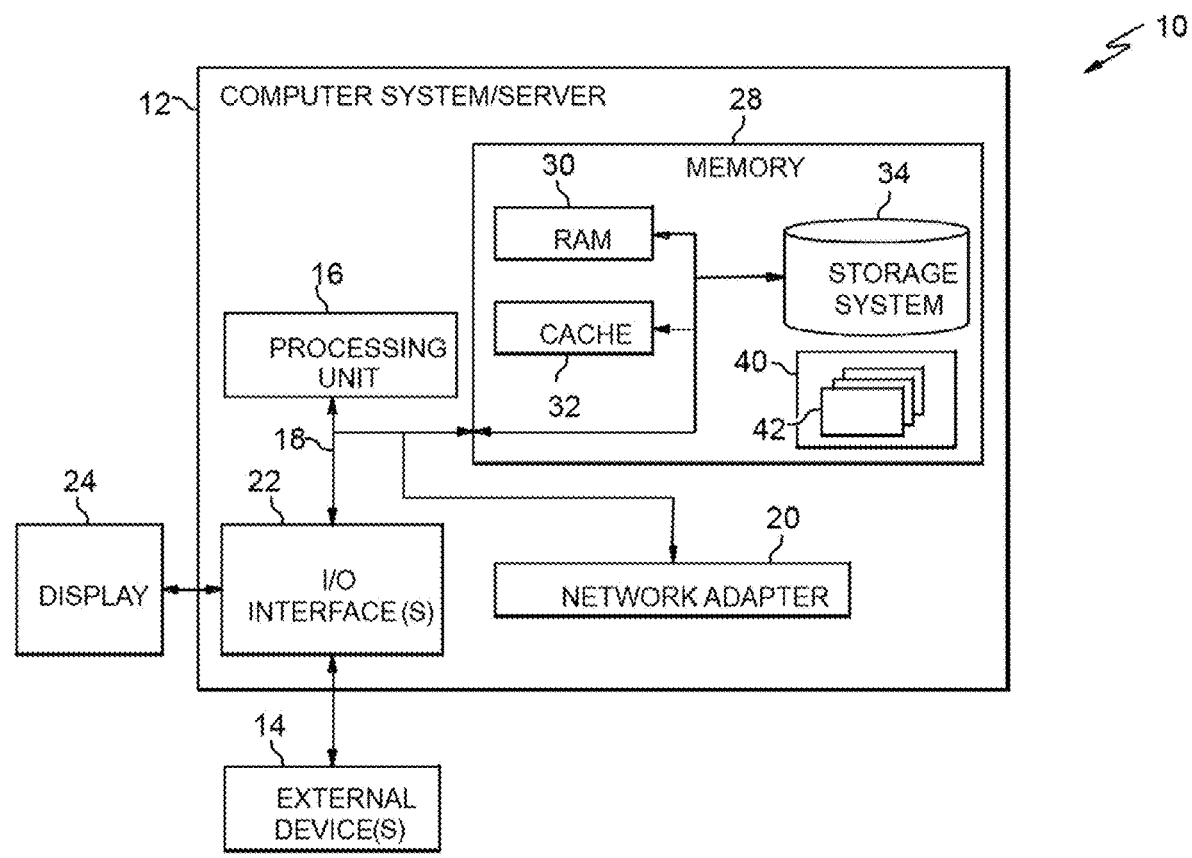
FIG. 1 depicts a cloud computing node according to an embodiment of the present invention.

Aspects of the present invention relate generally to computing systems and, more particularly, to distributed computing on the edge. Embodiments of the invention include a method a framework for providing network identity and a cooperative membership model where plural networked devices share resources and work together. Embodiments include provide an interaction model that defines how a trustee, delegate, and supplier interact with one another to establish a trusted model and a disciplined interaction framework between requesters, delegates, and suppliers. Implementations of the invention involve establishing a cooperative membership of networked devices and establishing paring of certain ones of the devices in the cooperative membership in order to share resources for performing a task for another one of the devices in the cooperative membership. Aspects of the invention may be implemented in a global Internet of Things (IoT) infrastructure that interconnects heterogeneous nodes each having different capabilities in terms of computing power and energy resources.

The power of IoT instrumentation and smarter automation is not fully exploited in the absence of limited capabilities in each device in a heterogeneous network. While many solutions rely on central controller or even local controller, they have not been able to effectively create an ecosystem for edge computing where most devices specialize in a specific capability but lack other capabilities. The current era of IoT involves using plural different devices each having with different capabilities, such as computer processing, memory, and other resources. These capabilities are most often used by each individual device on an individual requirement basis. As a result, many such devices are in an idle state for most of the time, such that these devices do not fully utilize their individual resources.

Implementations of the invention address these shortcomings by providing a system and method by which a collaborative environment is defied in which these individual devices play roles in a cooperative membership where some devices work on behalf of others according to a protocol. In embodiments, the protocol helps a device search for other devices in the network for the purpose of performing a task using available resources of the other devices.

Aspects of the invention provide an improvement to the technology of distributed computing systems by providing a method and system in which plural devices perform a task on behalf of another device in a distributed computing system. In embodiments, a method and system define different types of computer devices that perform different functions within the distributed computing system. In a particular embodiment, a method and system include a trusted entity device that is configured to: receive a request from a requester; determine one or more delegates that are currently capable of handling the request; send a request package to each of the one or more delegates, the request package including an authentication challenge; receive a solution to the authentication challenge from a supplier, the solution being provided by a particular delegate of the one or more delegates; determine the solution to the authentication challenge is valid; and instruct, in response to determining the solution to the authentication challenge is valid, the particular delegate to proceed with handling the request. In embodiments, in addition to the trusted entity device, the method and system include delegate device that is configured to: receive an authentication challenge from a trusted entity; determine a solution to the authentication challenge; send the solution to a supplier; receive instructions from the trusted entity to handle a request with the supplier; and handle the request.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
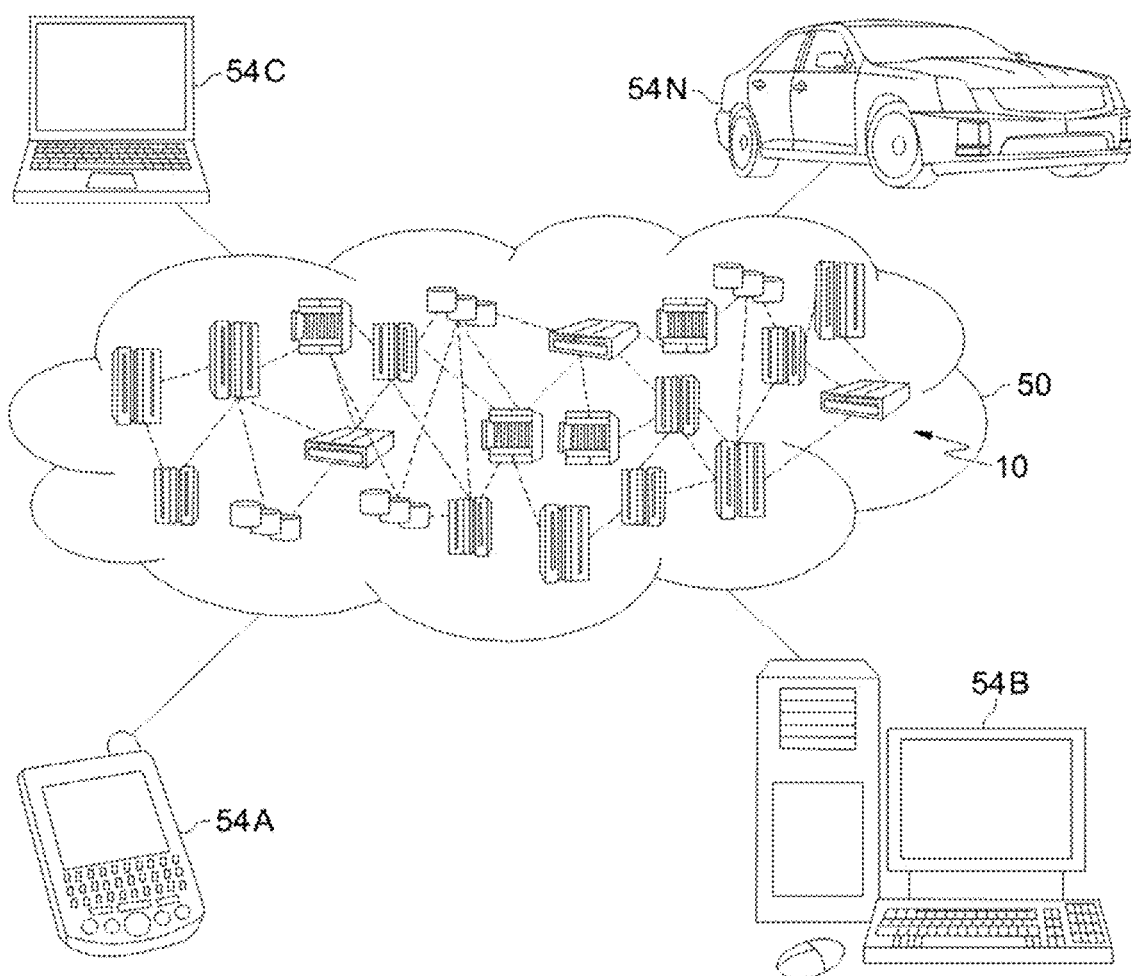
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
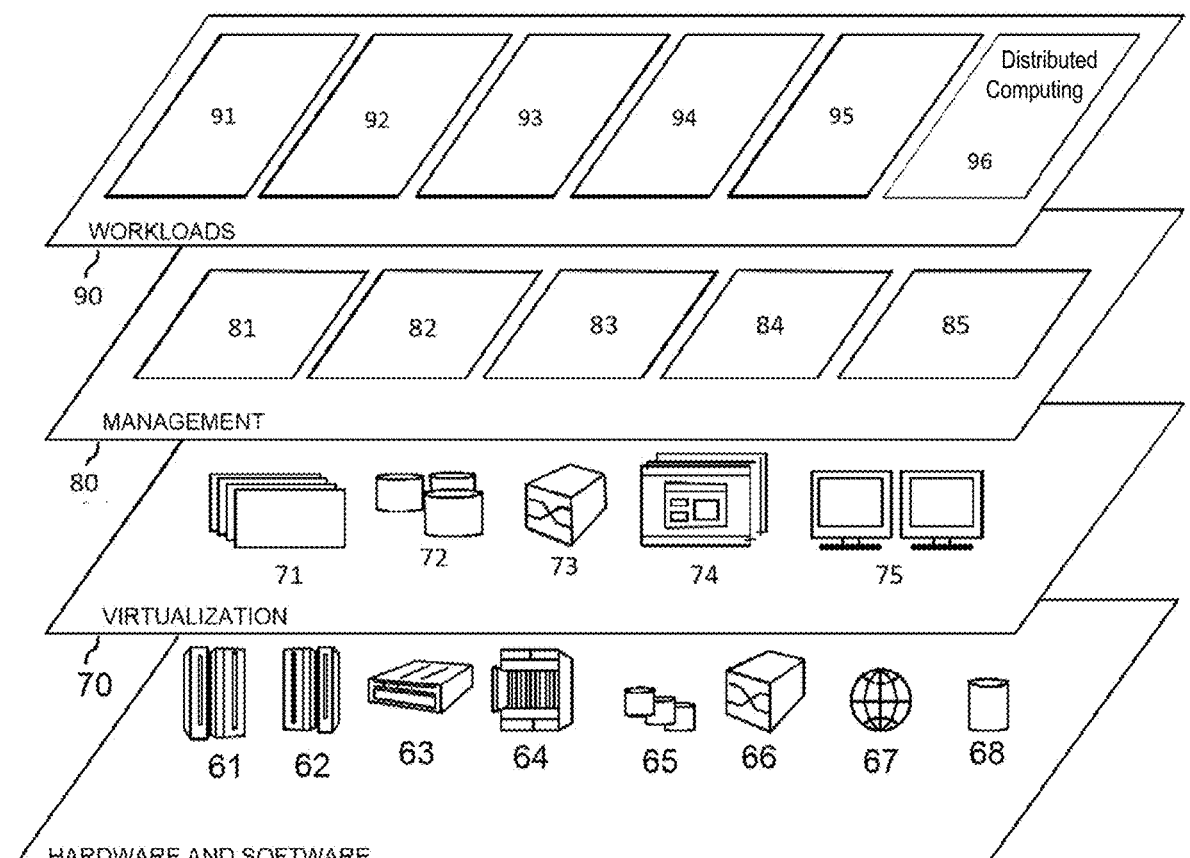
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed computing 96.

Implementations of the invention may include a computer system/server 12 of FIG. 1 in which one or more of the program modules 42 are configured to perform (or cause the computer system/server 12 to perform) one or more functions of the distributed computing 96 of FIG. 3. For example, the one or more of the program modules 42 may be configured to: receive a request from a requester; determine one or more delegates that are currently capable of handling the request; send a request package to each of the one or more delegates, the request package including an authentication challenge; receive a solution to the authentication challenge from a supplier, the solution being provided by a particular delegate of the one or more delegates; determine the solution to the authentication challenge is valid; and instruct, in response to determining the solution to the authentication challenge is valid, the particular delegate to proceed with handling the request. In another example, the one or more of the program modules 42 may be configured to: receive an authentication challenge from a trusted entity; determine a solution to the authentication challenge; send the solution to a supplier; receive instructions from the trusted entity to handle a request with the supplier; and handle the request.

Figure 4:
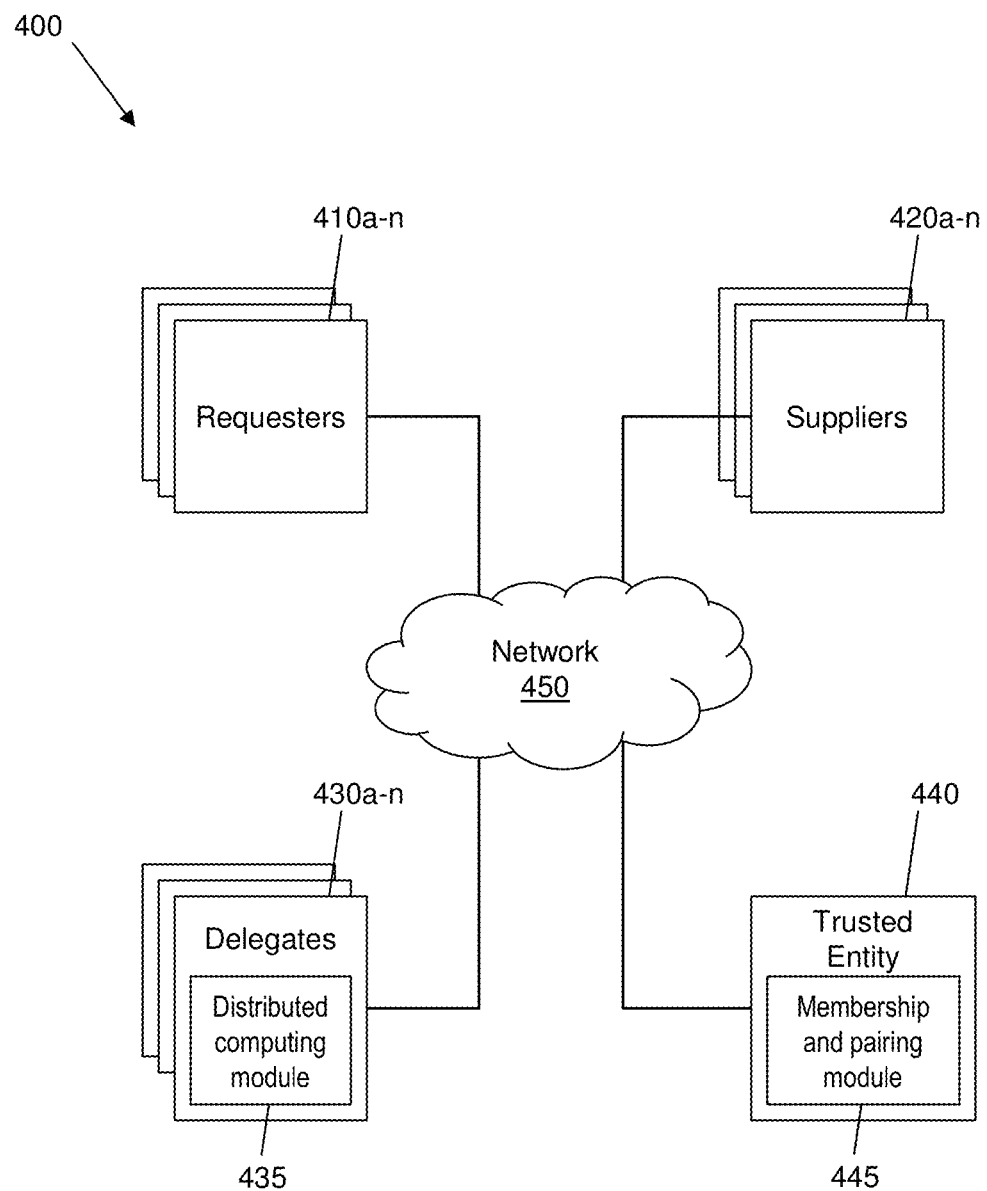
FIG. 4 shows a block diagram of an exemplary environment in accordance with aspects of the invention.

FIG. 4 shows a block diagram of an exemplary distributed computing environment 400 in accordance with aspects of the invention. The distributed computing environment 400 includes a number of requesters 410a-n, suppliers 420a-n, delegates 430a-n, and a trusted entity 440 all connected to a network 450. The network 450 comprises one or more communication networks such as, for example, one or more of a LAN, WAN, and the Internet.

In embodiments, each of the requesters 410a-n, suppliers 420a-n, delegates 430a-n, and trusted entity 440 is a computing device that comprises one or more elements of the computer system/server 12 of FIG. 1. In a particular embodiment, each of the requesters 410a-n is a first category of device (referred to herein as "type 1"), each of the suppliers 420a-n is a second category of device (referred to herein as "type 2"), and each of the delegates 430a-n and the trusted entity 440 is a third category of device (referred to herein as "type 3"). In one exemplary implementation, type 1 devices are highly resource-constrained nodes that are unable to support the computation cost of cryptography operations, but that require a security level much more advanced than the one afforded by dumb nodes. In this exemplary implementation, type 2 devices are other nodes that are less resource constrained than type 1 devices in that type 2 devices are able to perform with restriction cryptographic operations. In one example, type 2 devices are dedicated assisting servers or nodes belonging to a same local infrastructure, though being less impacted by energy constraints. In this exemplary implementation, type 3 devices are network servers with high energy, computing power, and storage capabilities.

According to a particular embodiment, requesters 410a-n are devices that have only enough computing resources to accomplish a pre-defined task, suppliers 420a-n are Internet-of-Thing (IoT) devices or other sensor devices that obtain and supply data, and delegates 430a-n and the trusted entity 440 are computing devices that have excess computing resources (e.g., memory, processing, etc.). In embodiments, the excess computing resources of the delegates 430a-n are used in a distributed fashion via the network 450 to perform computing functions on behalf of the requesters 410a-n using data from the suppliers 420a-n. In embodiments, all of the devices 410a-n, 420a-n, 430a-n, and 440 are physically co-located in a relatively small geographic area, such as in a same building or in a same portion of a city block, such that the distributed computing that one device (e.g., delegate 430a) performs on behalf of another device (e.g., requester 410a) occurs on the edge, rather than sending data to a remote server (e.g., a cloud server that is not physically co-located with the devices) and waiting for a response from the remote server.

In embodiments, each delegate 430a-n comprises a distributed computing module 435 and the trusted entity 440 comprises a membership and pairing module 445. Each module 435 and 445 may comprise one or more program modules such as program modules 42 described with respect to FIG. 1. Each delegate 430a-n and the trusted entity 440 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Figure 5A:
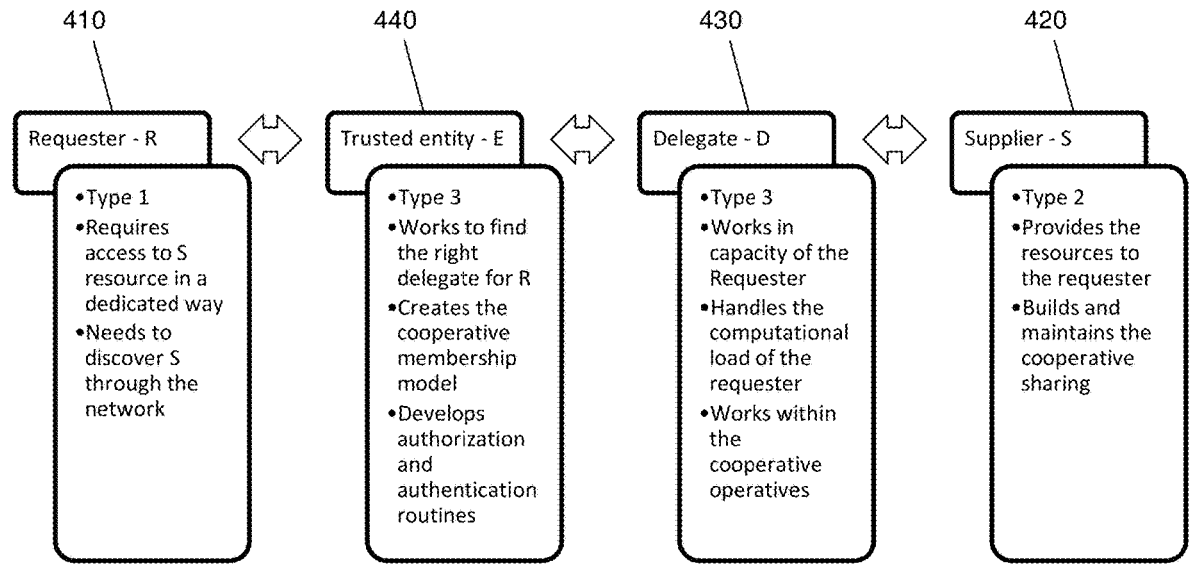
FIG. 5A shows a block diagram of devices in accordance with aspects of the invention.

FIG. 5A shows a block diagram of devices in accordance with aspects of the invention. In particular, FIG. 5A shows exemplary functions of a requester 410, trusted entity 440, delegate 430, and supplier 420 as described with respect to FIG. 4. In an exemplary implementation, the requester 410 is a type 1 device that has an operational need to access a shared resource within the distributed computing environment 400. In this implementation, the supplier 420 is a type 2 device that can set up and solve crypto puzzles. In this implementation, the delegate 430 and the trusted entity 440 are type 3 devices that are configured to take over a computational load from the type 1 and type 2 participants (e.g., from the requester 410 and/or supplier 420).

Still referring to the exemplary implementation of FIG. 5A, the requester 410 relies on the trusted entity 440 to find a delegate 430 that will perform a computing function on behalf of the requester 410. In this implementation, the delegate 430 communicates with the supplier 420 to obtain data that the delegate 430 uses in performing the computing function on behalf of the requester 410. These relationships are depicted in the matrix 500 shown in FIG. 5B.

In an example of establishing the cooperative membership, a requester 410 (also referred to as R) is a node requesting a shared resource, delegates 430 (also referred to as Di . . . Dn) are nodes that contact a responder and send it messages on behalf of an initiator, supplier 420 (also referred to as S) is a node that shares the resource, and trusted entity 440 (also referred to as E) is the entity that asserts that a delegate node is authorized to sign on behalf of the requester. In this example, delegates Di . . . Dn contact S and send it messages on behalf of R. Hence authorization and authentication questions arise at the delegate side, since these nodes should be provided with a requester's representativeness. In embodiments, to achieve this, the system uses a certificate including a public key of the delegate 430 associated with an authority to sign on behalf of a requester, all of which are signed with a private key of the requester 420 and delivered offline to the delegate 430, regardless the current exchange. However, the use of long-time authorization certificates can pose security concern. As such, in aspects of the invention, the certificate includes other dynamic parameters added by the requestor 410 in order to restrict the ability of a delegate 430 to act on behalf of the requester 410. In this example, M is a message that is sent by the requester R to gain access to the shared resource from the supplier S. In embodiments, the trusted entity E establishes the membership in a low latency and/or less computational cost manner. Given that the trusted entity E is a common trustee in the network that allows the requesters R to identify and lock their delegates D, then there are the following entity sets shown by Equation 1:

$$R=\{R\_1 \ldots R\_n\} | D=\{D\_1 \ldots D\_n\} | S=\{S\_1 \ldots S\_n\} \quad \text{Eq. (1)}$$

In this example, requester R's objective is to relay a message such that the correct delegate D accepts the message. While the delegates D are available as a type 3 resource within the network, they also operate as a full authority for requester R. In embodiments, in order to achieve such a level of delegation, the trusted entity E discerns that delegates D are primed into a set of trusted nodes using the operation depicted in FIG. 5C.

Figure 5C:
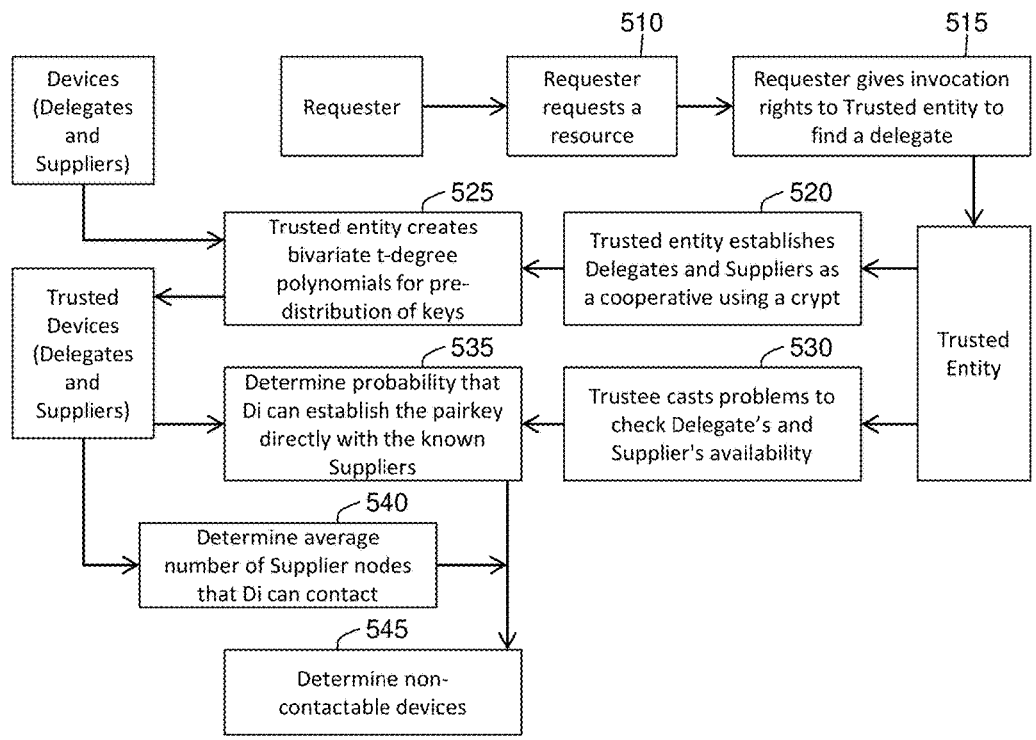
FIG. 5C shows a block diagram of devices and functions in accordance with aspects of the invention.
Figure 5B:
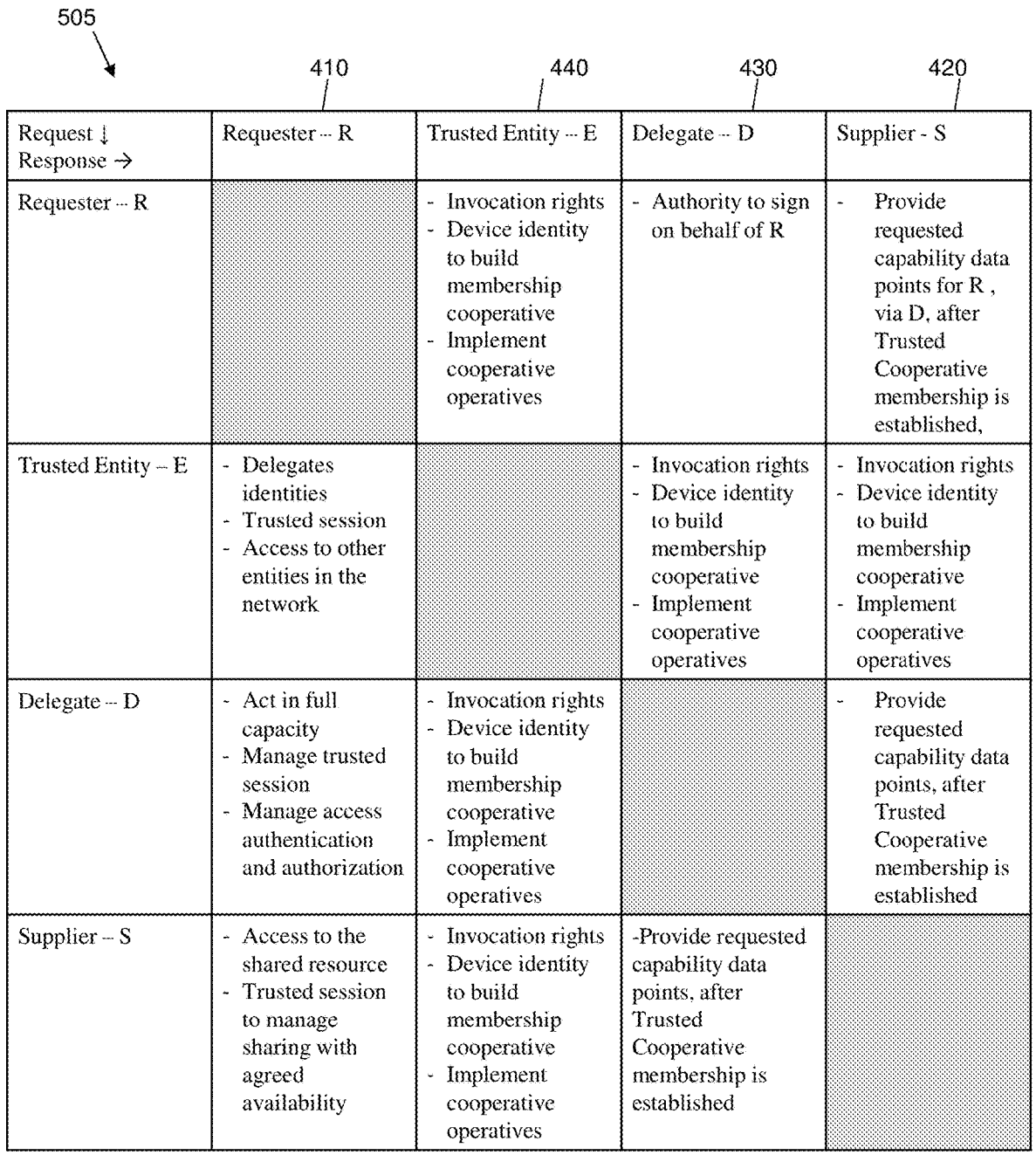
FIG. 5B shows a table of membership relationships in accordance with aspects of the invention.

FIG. 5C shows a block diagram of establishing a cooperative membership in accordance with aspects of the invention. In embodiments, the identity of each proposed delegate is known, these are transformed into a large prime number (p), and the system builds the key exchange on a modulus prime number network. At step 510, the requester (e.g., requester 410 or R) requests a resource. At step 515, the requester gives invocation rights to the trusted entity (e.g., trusted entity 440 or E) to find a delegate (e.g., delegate 430 or D) on behalf of the requester. At step 520, the trusted entity establishes delegates and suppliers as a cooperative group using cryptography techniques. At step 525, the trusted entity creates bivariate t-degree polynomials for pre-distribution of the keys. At step 530, the trusted entity casts problems to determine the availability of the delegates and suppliers. At step 535, the trusted entity determines a probability that a particular delegate (Di) can establish a pairkey (e.g., pairwise key) directly within the known suppliers. At step 540, the trusted entity determines the average number of supplier nodes that the particular delegate (Di) can contact. At step 545, the trusted entity determines the non-contactable devices.

In implementations, and as described above, step 525 involves the trusted entity creating bivariate t-degree polynomials for pre-distribution of the keys. Pairwise key establishment is a security service that enables the sensor nodes to communicate securely with each other. In embodiments, the t-degree polynomials are given by Equation 2:

$$\{f(x,y)=\Sigma_{i,j=0}^{t} a_{ij}x^i y^j\} \overleftarrow{\text{finite}} F_q : f(x,y)=f(y,x) \quad \text{Eq. (2)}$$

In Equation 2 shown above: i,j are the pair of the delegate Di and supplier Sj being denoted for a specific transaction instance; x,y, are the bivariate variables that drive the polynomial; Fq is a finite filed which covers the polynomial being solved for the prime number q; q is a large prime number such that it accommodates the cryptographic key to bind the paired resources together; and t is the degree of polynomial that acts as a threshold for the non-compromising nodes Nc within the network, such that Nc≤t.

In embodiments, the trusted entity computes, for each delegate Di, the finite-solution-root-share (FSFR) according to Equation 3:

$$f(x, y)_{i>0, j>0} = \begin{cases} f(i, y), \ f(i, j) = f(j, i) \\ f(j, y), \ f(i, j) = f(j, i) \end{cases} \quad \text{Eq. (3)}$$

Thus, for any two sensor nodes i and j, node i can compute the common key f(i, j) by evaluating f(i, y) at point j, and, node j can compute the same key f(j, i)=f(i, j) by evaluating f(j, y) at point i. In embodiments, the trusted entity generates a set F of s bivariate t-degree polynomials over the finite field Fq. For each delegate Di, the trusted entity randomly picks a subset of polynomials from F and assigns FSFR of these s' polynomials to the delegate Di. In this manner, the probability that the Di can establish the pairkey directly within the known suppliers is computed using Equation 4:

$$p = 1 - \prod_{i=0}^{s'-1} \frac{s - s' - i}{s - i} \quad \text{Eq. (4)}$$

Here, if α is the average number of supplier nodes that Di can contact, then the probability of the delegate finding the paired node through the network is calculated using Equation 5 as follows:

$$P_s=1-(1-p)(1-p^2)^\alpha \quad \text{Eq. (5)}$$

Here, if p=0.3 and α=30, we get Ps→4959~96%. Based on assuming that the non-contactable (or compromised nodes) as Nc, then Equation 5 can be written as Equation 6:

$$P_s(i) = \frac{N_c!}{(N_c - i)! \, i!} \left(\frac{s'}{s}\right)^i \left(1 - \frac{s'}{s}\right)^{N_c - i} \quad \text{Eq. (6)}$$

While, i≤α≤t≤max(x,y), Equation 6 will always give the probability of a useful key-pair exchange that establishes a successful pairing.

Figure 6:
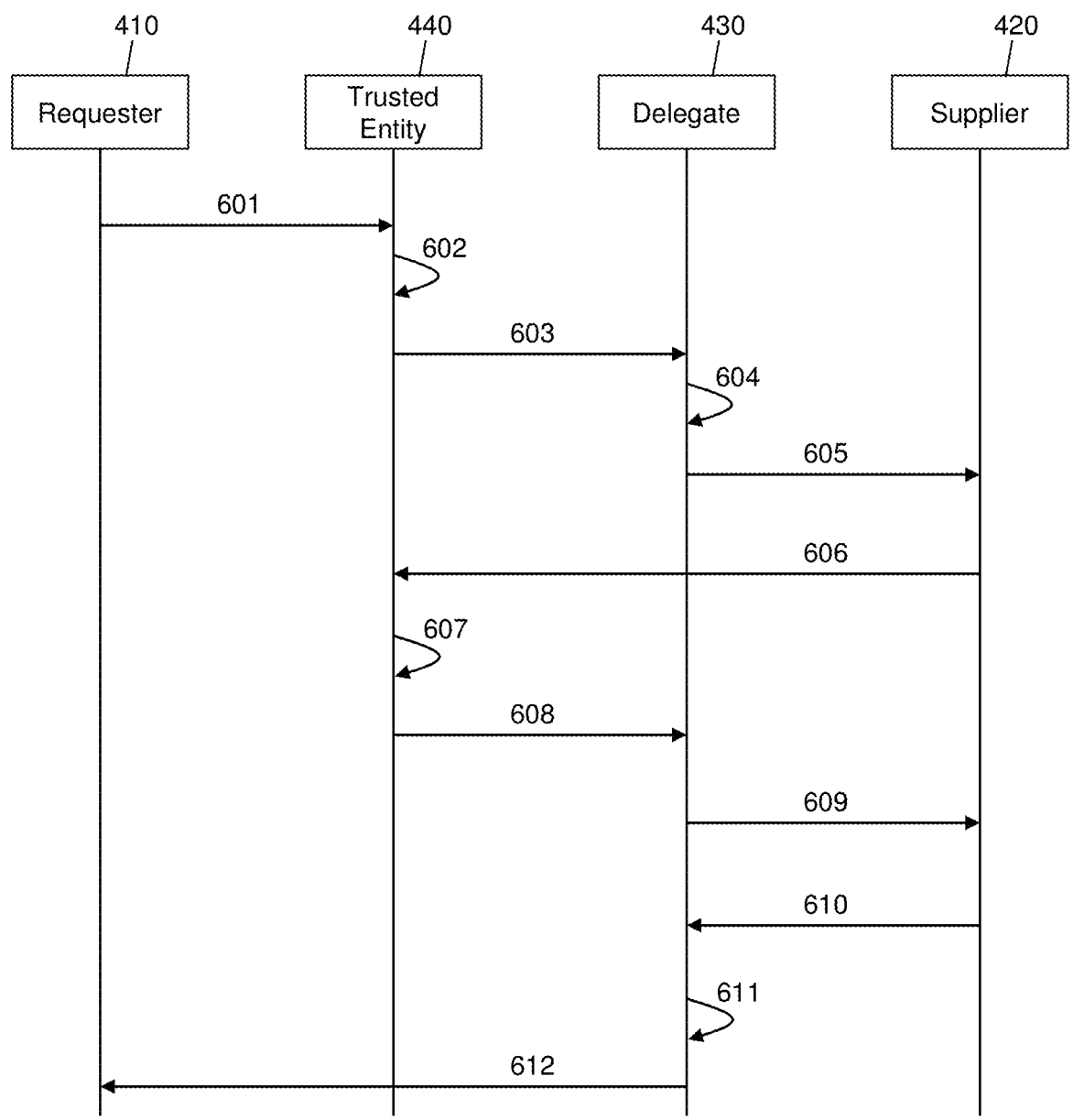
FIG. 6 shows a swim lane diagram of steps of an exemplary method in accordance with aspects of the invention.

FIG. 6 shows a swim lane diagram of steps of an exemplary method in accordance with aspects of the invention. Steps of the method may be carried out in the environment of FIG. 4 and are described with reference to elements depicted in FIG. 4.

At step 601, a requester 410 sends a request to a trusted entity 440 to perform a task. In embodiments, and as described with respect to FIG. 4, the task involves using computing resources that the requester does not possess and, thus, the request is a request for other devices in the environment 400 to perform functions on behalf of the requester 410.

At step 602, the trusted entity 440 receives the request (from step 601) and determines the resources needed to handle the request. In embodiments, the trusted entity 440 has access to a registry that stores data defining the following for each respective request that can be made by any requester 410 in the environment 400: a respective algorithm associated with the particular request; data needed as input to the algorithm; the identity of one or more suppliers 420 in the environment 400 capable of providing the data needed as input to the algorithm; an amount of computing resources (e.g., processor and memory) needed to handle the request. In embodiments, in response to receiving the request from the requester 410, the trusted entity 440 accesses the registry to determine: the algorithm associated with the request; data needed as input to the algorithm; the identity of one or more suppliers 420 in the environment 400 capable of providing the data needed as input to the algorithm; and an amount of computing resources (e.g., processor and memory) needed to handle the request.

In embodiments, step 602 further includes the trusted entity 440 determining a set of one or more delegates 430 that are currently capable of handling the request. In one example, the trusted entity 440 polls all the delegates 430 in the environment 400 to determine a current amount of excess computing resources (e.g., processor and memory) of each delegate. In response to the polling from the trusted entity 440, each delegate in the environment 400 responds to the trusted entity 440 with a message indicating its current amount of excess computing resources (e.g., processor and memory). In this example, the trusted entity 440 determines which delegates are currently capable of handling the request by comparing the current amount of excess computing resources (e.g., processor and memory) of each delegate to the amount of computing resources (e.g., processor and memory) needed to handle the request. Each delegate that has a current amount of excess computing resources that exceeds the amount of computing resources needed to handle the request is determined to be currently capable of handling the request, while those delegates that have a current amount of excess computing resources that is less than the amount of computing resources needed to handle the request is determined to be currently incapable of handling the request. The result is a set of delegates 430, which is a subset of all the delegates 430 in the environment 400, that is currently capable of handling the request.

At step 603, the trusted entity 440 sends a request package to each of the delegates 430 in the set of delegates determined at step 602. In embodiments, the request package includes: an authentication challenge; a pointer to the algorithm determined at step 602; and the identity of the one or more suppliers 420 determined at step 602 (e.g., the one or more suppliers configured to provide the data needed for the algorithm). In embodiments, the authentication challenge is based on cryptographic techniques. For example, the authentication challenge may comprise a crypto puzzle that a delegate receiving the challenge must solve to authenticate itself. In one example, the authentication challenge includes key-based authentication.

At step 604, each delegate 430 that received the request package (from step 603) attempts to solve the authentication challenge. In accordance with aspects of the invention, each delegate 430 that receives the authentication challenge does not send its solution to the authentication challenge back to the trusted entity 440. Instead, in embodiments, at step 605 each delegate 430 sends its solution to the authentication challenge to the one or more suppliers 420 identified in the request package. In embodiments, step 605 includes the delegate 430 sending data defining an identity of the delegate 430 with the solution.

At step 606, a supplier 420 that receives a solution to the authentication challenge (from one of the delegates 430) sends a response package to the trusted entity 440. In embodiments, the response package includes: the identity of this supplier 420; the identity of the delegate 430 that sent the solution to the authentication challenge to this supplier 420; and the solution to the authentication challenge that the delegate 430 sent to this supplier 420. In implementations, a single supplier 420 might receive respective solutions to the authentication challenge from plural different delegates 430 (e.g., when plural delegates 430 are determined at step 602). In embodiments, the supplier 420 uses the first one received as the basis for the response package that the supplier sends to the trusted entity 440.

At step 607, the trusted entity 440 determines whether the solution to the authentication challenge (included in the response package of step 606) satisfies the authentication challenge. This may be performed using whatever cryptographic technique is utilized in the authentication challenge.

At step 608, when the solution to the authentication challenge is valid, i.e., satisfies the authentication challenge (as determined at step 607), the trusted entity 440 sends an approval message to the particular delegate 430 that provided the solution (at steps 604 and 605). In embodiments, the approval message instructs the delegate 430 and supplier 420 pair that is identified in the response package (from step 606) to proceed with handling the request from step 601. In embodiments, step 608 also comprises the trusted entity 440 sending a stop message to all of the other delegates 430 determined at step 602 (e.g., other than the particular delegate 430 identified in the approval message) instructing these delegates to not handle the request from step 601. In this manner, the other delegates 430 that were identified as capable of handling this request, and that may have provided their own solution to the authentication challenge, are notified that they are not being tasked with handling this request.

At step 609, in response to receiving the approval message (of step 608) from the trusted entity 440, the particular delegate 430 identified in the approval message sends a data request to the supplier 420 identified in the approval message. In embodiments, the data request is a request for data from the supplier 420, which data is needed for running the algorithm associated with the request of step 601.

At step 610, the supplier 420 receives the data request (of step 609), obtains the data identified in the data request, and sends the data back to the delegate 430 that sent the data request. In embodiments, the supplier 420 is an IoT device that collects the data identified in the data request using one or more sensors.

At step 611, the particular delegate 430 receives the data (of step 610) from the supplier 420 and runs the algorithm using the received data. In some embodiments, a single delegate 430 obtains data from plural different suppliers 420 in order to run one or more algorithms associated with the request of step 601. In these embodiments, steps 609 and 610 are performed for each respective pair of the single delegate 430 and a respective one of the plural different suppliers 420, and then step 611 is performed using the different data from the different suppliers 420.

At step 612, the particular delegate 430 sends a response to the requester 410 based on output of the algorithm run at step 611. In embodiments, the delegate at step 612 is the same delegate that ran the algorithm at step 611. In one example, the requester 410 is a device that has pre-defined operating states, and the response at step 612 is a control signal that causes the requester 410 to enter one of the pre-defined operating states.

In a non-limiting exemplary use case that is intended to illustrate aspects of embodiments of the invention, the requester 410 is a computer-controlled sprinkler system for watering grass in a walking area around a sidewalk in an office space. In this exemplary use case, the sprinkler system is programmed to run only when certain pre-defined conditions are satisfied based on temperature, humidity, and the presence of people on the sidewalk; however, the sprinkler system does not include sensors and/or computing resources to determine, by itself, whether the conditions are satisfied at any given time. In this exemplary use case, the delegate 430 is a digital sign also in the office space, the digital sign having excess computing resources. In this exemplary use case, the trusted entity 440 is a secure server running in the office space. Also in this exemplary use case, the suppliers 420 include: a first IoT device in the office space that includes a humidity sensor; a second IoT device in the office space that includes a temperature sensor; and a third IoT device in the office space that obtains video imagery of the area around and/or including the sidewalk.

In this exemplary use case, an exemplary operation is as follows: the sprinkler system sends a request to the secure server asking for a determination of whether the sprinkler system should turn on; the secure server identifies and approves the digital sign and the first, second, and third IoT devices to handle the request, e.g., in the manner described above with respect to FIG. 6; the digital sign obtains data from the first, second, and third IoT devices and runs one or more algorithms using this data to determine if the pre-defined conditions of the sprinkler system are satisfied; the digital sign sends a control signal to the sprinkler system based on the output of the one or more algorithms. In the case when all of the pre-defined conditions of the sprinkler system are satisfied, the control signal is a signal that causes the sprinkler system to turn on. In the case when not all of the pre-defined conditions of the sprinkler system are satisfied, the control signal is a signal that causes the sprinkler system to remain off.

Figure 7:
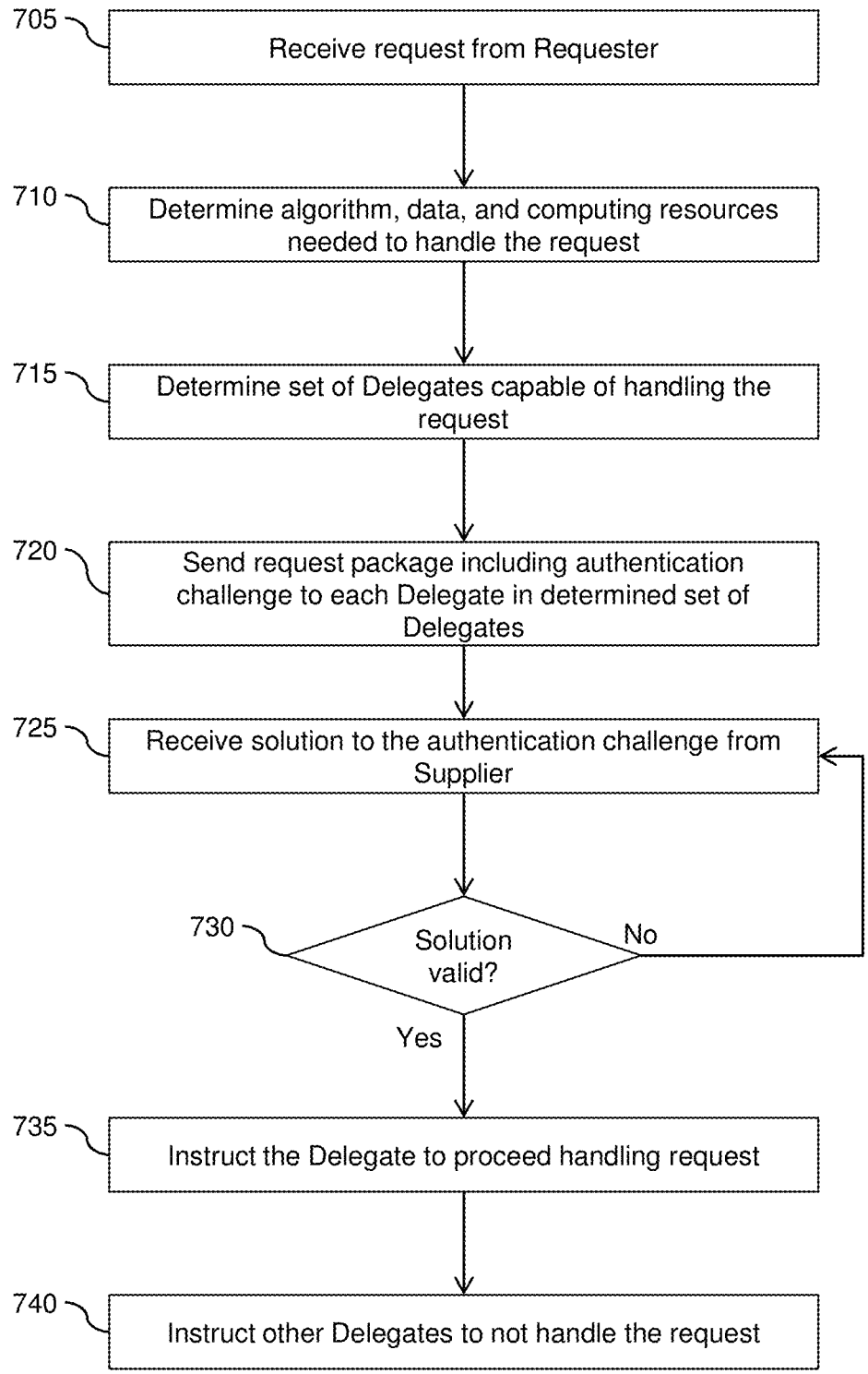
FIG. 7 shows a flowchart of an exemplary method in accordance with aspects of the invention.

FIG. 7 shows a flowchart of an exemplary method performed by a trusted entity in accordance with aspects of the present invention. Steps of the method may be carried out by the trusted entity 440 in the environment 400 of FIG. 4 and are described with reference to elements depicted in FIG. 4 and also with reference to the steps described at FIG. 6.

At step 705, the trusted entity 440 receives a request from a requester 410. In embodiments, step 705 is performed in the manner described at step 601 of FIG. 6.

At step 710, the trusted entity 440 determines one or more algorithms, data, and computing resources needed to handle the request of step 705. In embodiments, step 710 is performed in the manner described at step 602 of FIG. 6.

At step 715, the trusted entity 440 determines set of delegates 430 that are currently capable of handling the request of step 705. In embodiments, step 715 is performed in the manner described at step 602 of FIG. 6.

At step 720, the trusted entity 440 sends a request package, including an authentication challenge, to each delegate in determined set of delegates of step 715. In embodiments, step 720 is performed in the manner described at step 603 of FIG. 6.

At step 725, the trusted entity 440 receives a solution to the authentication challenge from a supplier 420. In embodiments, step 725 is performed in the manner described at step 606 of FIG. 6, with the solution to the authentication challenge being included in a response package.

At step 730, the trusted entity 440 determines whether the solution to the authentication challenge (of step 725) is valid. In embodiments, step 730 is performed in the manner described at step 607 of FIG. 6. In the event the solution is not valid, then the trusted entity 440 waits for another response from a supplier. In the event the solution is valid, then at step 735 the trusted entity 440 instructs the delegate (that provided the valid solution) to proceed with handling request. In embodiments, step 735 is performed in the manner described at step 608 of FIG. 6. At step 740, the trusted entity 440 instructs other delegates to not handle the request. In embodiments, step 740 is performed in the manner described at step 608 of FIG. 6.

Figure 8:
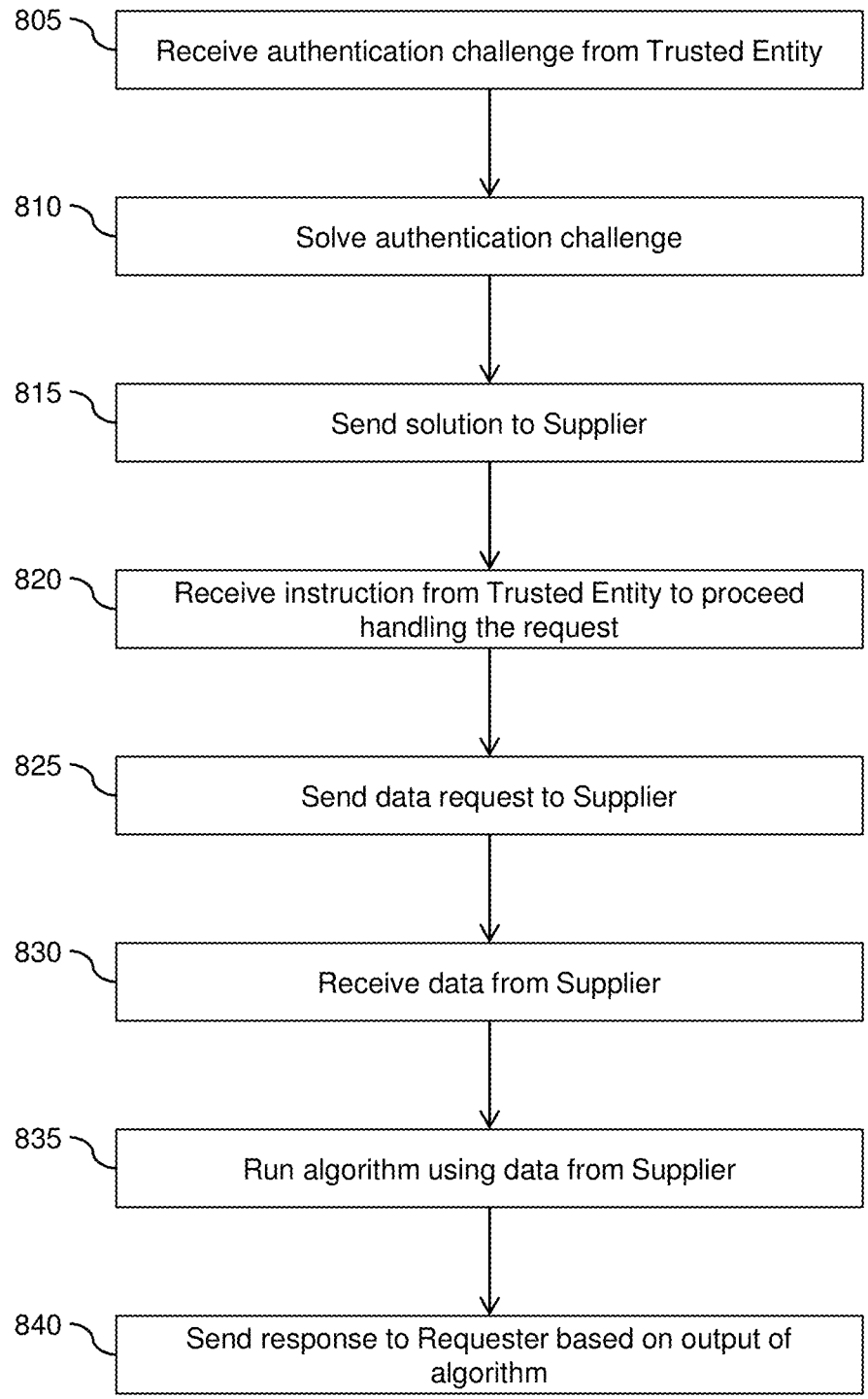
FIG. 8 shows a flowchart of another exemplary method in accordance with aspects of the invention.

FIG. 8 shows a flowchart of an exemplary method performed by a delegate in accordance with aspects of the present invention. Steps of the method may be carried out by a delegate 430 in the environment 400 of FIG. 4 and are described with reference to elements depicted in FIG. 4 and also with reference to the steps described at FIG. 6.

At step 805, the delegate 430 receives an authentication challenge from a trusted entity 440. In embodiments, step 805 is performed in the manner described at step 603 of FIG. 6, with the authentication challenge being included in a request package.

At step 810, the delegate 430 solves the authentication challenge of step 805. In embodiments, step 810 is performed in the manner described at step 604 of FIG. 6.

At step 815, the delegate 430 sends the solution (of step 810) to a supplier 420. In embodiments, step 815 is performed in the manner described at step 605 of FIG. 6.

At step 820, the delegate 430 receives instruction from the trusted entity 400 to proceed with handling the request. In embodiments, step 820 is performed in the manner described at step 608 of FIG. 6.

At step 825, the delegate 430 sends a data request to the supplier 420. In embodiments, step 825 is performed in the manner described at step 609 of FIG. 6.

At step 830, the delegate 430 receives the requested data from the supplier 420. In embodiments, step 830 is performed in the manner described at step 610 of FIG. 6.

At step 835, the delegate 430 runs an algorithm using the data obtained at step 830. In embodiments, step 835 is performed in the manner described at step 611 of FIG. 6, with the algorithm including one or more algorithms defined as being associated with the request made by the requester.

At step 840, the delegate 430 sends a response to the requester 410 based on an output of the algorithm of step 835. In embodiments, step 840 is performed in the manner described at step 612 of FIG. 6.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, a request from a requester;
determining, by the computing device, one or more delegates that are currently capable of handling the request;
sending, by the computing device, a request package to each of the one or more delegates, the request package including an authentication challenge;
receiving, by the computing device, a solution to the authentication challenge from a supplier, the solution being provided by a particular delegate of the one or more delegates;
determining, by the computing device, the solution to the authentication challenge is valid; and
instructing, by the computing device and in response to determining the solution to the authentication challenge is valid, the particular delegate to proceed with handling the request.

2. The method of claim 1, wherein:
the computing device is a trusted entity; and
the trusted entity, the requester, the one or more delegates, and the supplier are all different devices connected in a cooperative membership in a distributed computing environment.

3. The method of claim 2, wherein:
the requester is a first type of device;
the supplier is a second type of device different than the first type of device; and
the trusted entity and the one or more delegates are a third type of device different from both the first type of device and the second type of device.

4. The method of claim 2, further comprising the trusted entity establishing the cooperative membership.

5. The method of claim 1, further comprising determining: an algorithm associated with the request; data needed for the algorithm; one or more suppliers to obtain the data needed for the algorithm; and an amount of computing resources needed to handle the request.

6. The method of claim 5, wherein the determining the one or more delegates that are currently capable of handling the request comprises:
polling each delegate in a distributed computing environment for its current amount of excess computing resources; and
comparing the current amount of excess computing resources of each delegate to the amount of computing resources needed to handle the request.

7. The method of claim 5, wherein the request package includes:
a pointer to the algorithm; and
an identity of the one or more suppliers to obtain the data needed for the algorithm.

8. The method of claim 7, wherein the supplier from which the computing device receives the solution is one of the one or more suppliers to obtain the data needed for the algorithm.

9. The method of claim 1, further comprising instructing, by the computing device and in response to determining the solution to the authentication challenge is valid, other ones of the one or more delegates to not proceed with handling the request.

10. A computer program product comprising one or more computer readable storage media having program instructions collectively stored on the one or more computer readable storage media, the program instructions executable to:
receive a request from a requester;
determine one or more delegates that are currently capable of handling the request;
send a request package to each of the one or more delegates, the request package including an authentication challenge;
receive a solution to the authentication challenge from a supplier, the solution being provided by a particular delegate of the one or more delegates;
determine the solution to the authentication challenge is valid; and
instruct, in response to determining the solution to the authentication challenge is valid, the particular delegate to proceed with handling the request.

11. The computer program product of claim 10, wherein the program instructions are executable to determine: an algorithm associated with the request; data needed for the algorithm; one or more suppliers to obtain the data needed for the algorithm; and an amount of computing resources needed to handle the request.

12. The computer program product of claim 11, wherein the determining the one or more delegates that are currently capable of handling the request comprises:
polling each delegate in a distributed computing environment for its current amount of excess computing resources; and
comparing the current amount of excess computing resources of each delegate to the amount of computing resources needed to handle the request.

13. The computer program product of claim 11, wherein the request package includes:
a pointer to the algorithm; and
an identity of the one or more suppliers to obtain the data needed for the algorithm.

14. The computer program product of claim 13, wherein the supplier from which the computing device receives the solution is one of the one or more suppliers to obtain the data needed for the algorithm.

15. The computer program product of claim 10, the program instructions are executable to instruct other ones of the one or more delegates to not proceed with handling the request.

16. A system comprising:
a processor, one or more computer readable storage media, and program instructions collectively stored on the one or more computer readable storage media, the program instructions executable to:
receive an authentication challenge from a trusted entity;
determine a solution to the authentication challenge;
send the solution to a supplier;
receive instructions from the trusted entity to handle a request with the supplier; and
handle the request.

17. The system of claim 16, wherein the handling the request includes:
sending a data request to the supplier;
receiving data in response to the data request;
running an algorithm using the received data; and
sending a response to the requester based on the running the algorithm.

18. The system of claim 17, wherein the authentication challenge is included in a request package including: a pointer to the algorithm; and an identity of the supplier.

19. The system of claim 17, wherein:
the supplier is one of plural suppliers identified for handling the request; and
the handling the request includes:
sending a respective data request to each of the plural suppliers;
receiving data in response to the respective data requests;
running an algorithm using the received data; and
sending a response to the requester based on the running the algorithm.

20. The system of claim 16, further comprising:
receiving a polling request from the trusted entity to identify a current amount of excess computing resources; and
responding to the trusted entity with the current amount of computing resources.

* * * * *